United States Patent
Wei et al.

(10) Patent No.: US 7,602,622 B2
(45) Date of Patent: *Oct. 13, 2009

(54) COMPENSATOR WITH FILTER FOR USE WITH A THREE-PHASE DRIVE POWERING A ONE-PHASE LOAD

(75) Inventors: Lixiang Wei, Whitefish Bay, WI (US); Gary L. Skibinski, Milwaukee, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 141 days.

This patent is subject to a terminal disclaimer.

(21) Appl. No.: 11/461,697

(22) Filed: Aug. 1, 2006

(65) Prior Publication Data
US 2007/0030708 A1 Feb. 8, 2007

Related U.S. Application Data

(60) Provisional application No. 60/704,614, filed on Aug. 2, 2005.

(51) Int. Cl.
*H02M 5/458* (2006.01)
(52) U.S. Cl. .............................. 363/37; 363/40
(58) Field of Classification Search ................. 363/46, 363/44, 54, 55, 56.1, 159, 71, 72, 34–41, 363/47, 48; 307/105
See application file for complete search history.

(56) References Cited

U.S. PATENT DOCUMENTS

| | | | |
|---|---|---|---|
| 3,746,963 A | 7/1973 | VeNard, II | |
| 4,651,265 A | 3/1987 | Stacey et al. | |
| 4,689,735 A | 8/1987 | Young | |
| 4,935,860 A | 6/1990 | Kirchberg et al. | |
| 4,977,492 A | 12/1990 | Kirchberg, Jr. et al. | |
| 5,047,910 A * | 9/1991 | Levran et al. | 363/41 |
| 5,341,280 A * | 8/1994 | Divan et al. | 363/37 |
| 6,014,017 A | 1/2000 | Weinhold et al. | |
| 6,191,676 B1 * | 2/2001 | Gabor | 336/160 |
| 6,288,915 B1 | 9/2001 | Stemmler et al. | |
| 6,995,992 B2 | 2/2006 | Wei et al. | |

OTHER PUBLICATIONS

Toshihisa Shimizu, et al., A Unity Power Factor PWM Rectifier with DC Ripple Compensation, IEEE Transactions on Industrial Electronics, vol. 44, No. 4, Aug. 1997.

S. B. Dewan, et al. Steady-State Analysis of Static Single-Phase to Three-Phase Converters, 1981 IEEE, University of Toronto, Toronto, M5S 1A4 Ontario Canada.

Shahidul I. Kahn, et al., A Novel Single- to Three-Phase Static Converter, IEEE Transactions on Industry Applications, vol. 25, No. 1, Jan./Feb. 1989.

(Continued)

*Primary Examiner*—Rajnikant B Patel
(74) *Attorney, Agent, or Firm*—Quarles & Brady LLP; Alexander R. Kuszewski

(57) ABSTRACT

The present invention is directed to a compensator-filter circuit for reducing low order current harmonics in a three-phase drive system driving a single-phase load, the three-phase drive system including a three-phase source voltage connected to a rectifier system connected to a DC link capacitor connected to a three-phase voltage source inverter.

20 Claims, 6 Drawing Sheets

OTHER PUBLICATIONS

Francisco F. Zapata, et al., Analysis and Design of a Single-Phase PWM Current Source Rectifier with Neutral Lag, 1998 IEEE, Concepcion, Chile.

Makoto Saito, et al., A Single to Three Phase Matrix Converter with a Power Decupling (sic) Capability, 2004 35th Annual IEEE Power Electronics Specialists Conference, Aachen, Germany, 2004.

Koichi Tsuno, and Toshihisa Shimizu, et al., Optimization of the DC Ripple Energy Compensating Circuit on a Single-phase Voltage Source PWM Rectifier, 2004 35th Annual IEEE Power Electronics Specialists Conference, Aachen, Germany, 2004.

* cited by examiner

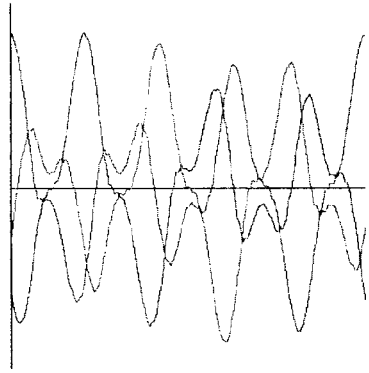
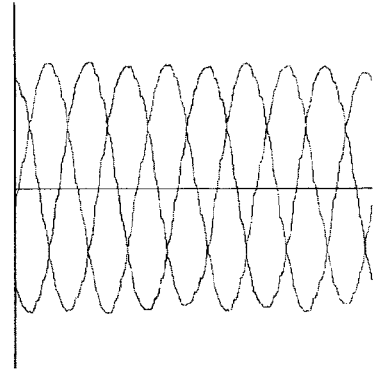
FIG. 1A
FIG. 1B
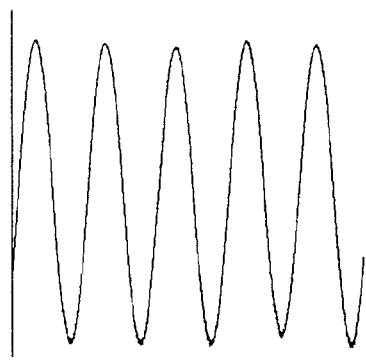
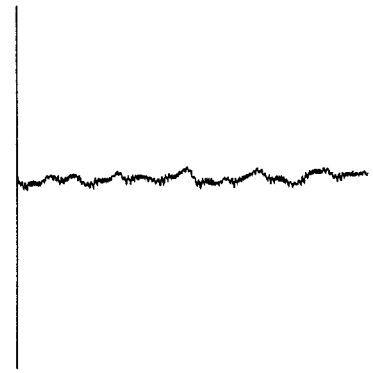
FIG. 2A
FIG. 2B

COMPENSATOR WITH FILTER FOR USE WITH A THREE-PHASE DRIVE POWERING A ONE-PHASE LOAD

CROSS-REFERENCE TO RELATED APPLICATIONS

This application claims the benefit of U.S. Provisional application 60/704,614 filed Aug. 2, 2005, hereby incorporated by reference.

STATEMENT REGARDING FEDERALLY SPONSORED RESEARCH OR DEVELOPMENT

Not applicable

BACKGROUND OF THE INVENTION

The present invention relates generally to power conversion and conditioning, and more particularly, to a compensator with output filter for reducing current harmonics from an unbalanced load.

Power plants are linked to power consuming facilities (e.g., buildings, factories, etc.) via utility grids designed so as to be extremely efficient in delivering large amounts of power. To facilitate efficient distribution, power is delivered over long distances as low frequency three-phase AC current.

Despite being distributable efficiently, low frequency AC current is sometimes not suitable for end use in consuming facilities. Thus, prior to end use, power delivered by a utility has to be converted to a usable form. To this end, a typical power "conditioning" configuration includes an AC-to-DC rectifier that converts the utility AC power to DC across positive and negative DC buses (i.e., across a DC link) and an inverter linked to the DC link that converts the DC power back to three-phase AC power having an end-useable form (e.g., three-phase relatively high frequency AC voltage). A controller controls the inverter in a manner calculated to provide voltage waveforms required by the consuming facility.

Motors and their associated loads are one type of common inductive load employed at many consuming facilities. While the present invention is applicable to different load types, to simplify this explanation, an exemplary motor with an associated load will be assumed. To drive a motor, an inverter includes a plurality of switches that can be controlled to link and delink the positive and negative DC buses to motor supply lines. The linking/delinking sequence causes voltage pulses on the motor supply lines that together define alternating voltage waveforms. When controlled correctly, the waveforms cooperate to generate a rotating magnetic field inside a motor stator core. The magnetic field induces (hence the nomenclature "induction motor"), a field in motor rotor windings. The rotor field is attracted to the rotating stator field, and hence the rotor rotates within the stator core.

Generally, a three-phase voltage source inverter is used to drive a three-phase balanced load. Under this condition, the inverter itself generates only high order current harmonics to its DC link side. The average current flowing inside the DC link side is constant. This can dramatically reduce the ripple current of its DC link capacitor. Thus, it is much easier for the drive to generate high quality input current waveforms using various topologies, (e.g., multiple phase rectifier system, regenerative drive, passive and active filtering rectifier system, etc.) Typically, it is not a problem for a standard designed product to meet IEEE 519 current harmonics specifications under three-phase balanced load conditions.

However, it is not uncommon to use a three-phase inverter product to drive a single-phase load such as a heater. This arrangement reduces the number of drive types that a user must stock and maintain. Due to a single phase configuration, a large number of low order current harmonics are generated in the DC link. With these low order harmonics, a corresponding large number of low order current harmonics can be generated by the rectifier system. It is typically not possible to have a standard design inverter drive a one phase load and still meet IEEE 519 current harmonics specifications. Moreover, a significant amount of the current and voltage stresses are added to either the DC link or the rectifier side components, thus reducing the reliability of the overall drive.

To this end, FIG. 1A illustrates the input current of a three-phase drive system with an 18 pulse front end rectifier driving a single-phase load, and FIG. 1B illustrates the input current of a three-phase drive system driving a conventional three-phase load. Note the distortions in the input current evident in FIG. 1A when a single-phase load is driven. FIG. 2A illustrates the DC link current of a three-phase drive system driving a single-phase load, and FIG. 2B illustrates the DC link current of a three-phase drive system driving a conventional, three-phase load. Again notice the large amount of ripple voltage seen in the DC link current under single-phase load conditions. In addition to causing input current and DC link distortions, the low-order current associated with a single-phase load driven by a three-phase converter can cause stability problems in controlling of the rectifier.

BRIEF SUMMARY OF THE INVENTION

These and other objects, advantages and aspects of the invention will become apparent from the following description. The particular objects and advantages described herein may apply to only some embodiments falling within the claims, and thus do not define the scope of the invention. In the description, reference is made to the accompanying drawings which form a part hereof, and in which there is shown a preferred embodiment of the invention. Such embodiment does not necessarily represent the full scope of the invention, and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and:

FIGS. 1A and 1B are graphs illustrating input current for a three-phase drive with an 18 pulse front end rectifier powering a single-phase load and a three-phase load, respectively;

FIGS. 2A and 2B are graphs illustrating DC link current for a three-phase drive powering a single-phase load and a three-phase load, respectively;

Figure 3:
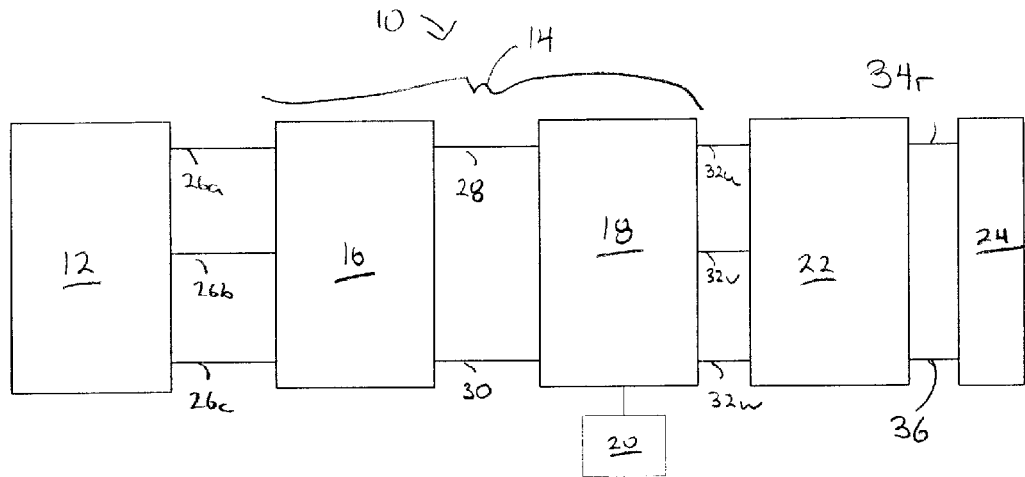
FIG. 3 is a simplified block diagram of a drive system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the claims at the end of the specification. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 3, the present invention shall be described in the context of a drive system 10. The drive system 10 includes a power supply 12, a drive unit 14, including a rectifier 16, an inverter 18, and a controller 20, a compensator-filter circuit 22, a single-phase load 24 (e.g., a single-phase motor or heater) and a plurality of lines and buses that link the aforementioned components together in the manner described hereinafter.

Still referring to FIG. 3, the power supply 12 provides three-phase AC voltage to rectifier 16. The nominal line voltage of power supply 12 may vary depending on the particular implementation. Rectifier 16 receives three-phase power from the power supply 12 over lines 26a, 26b, and 26c and converts the AC power to DC. The rectifier 16 provides the DC power to inverter 18 on positive and negative DC buses 28 and 30, respectively. There are various types of rectifiers 16 employed to convert the AC power to DC. Some rectifiers are passive and do not require input from a controller (e.g., controller 20). For example, a multiple phase (e.g., 6, 18, 24) diode rectifying bridge or a rectifier with a passive or an active filter circuit may be used in conjunction with a bus capacitor and filters to perform the rectifying function. The bus capacitor, not shown, is also known as a DC link capacitor because it is connected to positive and negative DC buses 28 and 30 that link rectifier 16 to inverter 18. Other types of rectifiers are active. For example, a pulse width modulated (PWM) rectifier includes a plurality of switching transistors controlled by the controller 20 to generate the DC potential across the bus capacitor (DC link capacitor). Active PWM rectifiers are sometimes employed where energy present in load 24 (e.g., the motor windings) is regeneratively supplied back to the power supply 12 when load 24 is disconnected. In the passive rectifier case, such power may be dissipated in braking resistors coupled across load 24 when the load is disconnected.

The inverter 18 is positioned between positive and negative DC buses 28, 30, respectively, of the rectifier 16. Although not illustrated, as is well known in the motor control industry, inverter 18 includes a plurality of switching devices (e.g., IGBT's, BJT's, etc.) that are positioned between the positive and negative DC buses 28, and supply lines 32u, 32v, and 32w. Controller 20 opens and closes specific combinations of the inverter switches to generate positive and negative DC voltage pulses on each of supply lines 32u, 32v, and 32w. By opening and closing the inverter switches in specific sequences, inverter 18 generates AC voltages having controllable amplitudes and frequencies on each of the supply lines 32u, 32v, and 32w. Drive unit 14 generates AC voltages on lines 32u, 32v, and 32w that are substantially 120 degrees out of phase with each other so that drive unit 14 provides three-phase power. Lines 32u, 32v, and/or 32w are coupled to compensator-filter circuit 22. Compensator-filter circuit 22 is connected to output lines 34 and 36 that are connected to single-phase load 24, as will be described in greater detail below.

As is well known in the art, inverter 18 may have various topologies, including a voltage source inverter and a current source inverter. Typically, a voltage source inverter includes a flyback diode in parallel with each of the IGBT switching devices, while a current source inverter includes a diode in series with the switching device. The voltage output of the voltage source inverter is a PWM pulse signal, while the current source inverter generally provides a smooth sinusoidal output. In the art, current source inverters are employed for high voltage, high current applications (e.g., >1000V), while voltage source inverters are employed in systems with lower voltage ratings.

Compensator-filter circuit 22 suppresses low frequency harmonics caused by the single-phase load 24 drawing power from the three-phase power supplied by the drive unit 14. For example, an uncompensated single-phase load 24 generates a large amount of low-order current harmonics on the DC link capacitor (not illustrated) that resides between the rectifier 16 and the inverter 18. These harmonics increase the ratings of the DC link capacitor and increase the ripple voltage of the DC link capacitor. An uncompensated single-phase load 24 can also heavily distort the input current waveform to the drive 14 on the lines 26a, 26b, and 26c so that it is not possible to meet some of the industrial standard harmonics specifications (e.g., IEEE 519). Furthermore, an uncompensated single-phase load 24 can disrupt the control of an active front end rectifier thereby adversely affecting drive control. In addition to compensating for low-order current harmonics, compensator-filter circuit 22 filters out ripple current generated by inverter 18.

Figure 4:
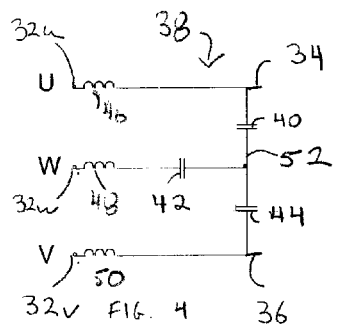
FIGS. 4, 5 and 6 are schematic views of compensator-filter circuits.

Referring now to FIG. 4, in accordance with an embodiment of the invention, a compensator-filter circuit 38 includes a first compensator capacitor 40, a second compensator capacitor 42, a third compensator capacitor 44, a first filter inductor 46, a second filter inductor 48, and a third filter inductor 50. First filter inductor 46 is connected between supply line 32u and output line 34. First compensator capacitor 40 is connected between line 34 and a compensator line 52. Second compensator capacitor 42 and second filter inductor 48 are connected in series between supply line 32w and compensator line 52. Third compensator capacitor 44 is connected between compensator line 52 and output line 36. Third filter inductor 50 is connected between supply line 32v and output line 36.

Figure 5:
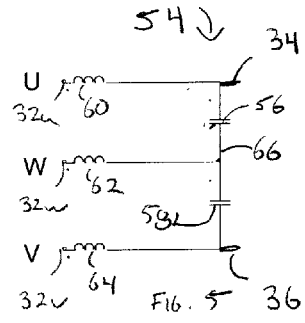

Referring now to FIG. 5, in accordance with an embodiment of the invention, a compensator-filter circuit 54 includes a first compensator capacitor 56, a second compensator capacitor 58, a first filter inductor 60, a second filter inductor 62, and a third filter inductor 64. First filter inductor 60 is connected between lines 32u and output line 34. First compensator capacitor 56 is connected between output line 34 and a compensator line 66. Second filter inductor 62 is connected between supply line 32w and compensator line 66. Second compensator capacitor 58 is connected between compensator line 66 and output line 36. Third filter inductor 64 is connected between supply line 32v and output line 36.

Figure 6:
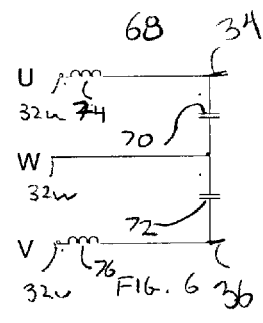

Referring now to FIG. 6, in accordance with an embodiment of the invention, a compensator-filter circuit 68 includes a first compensator capacitor 70, a second compensator capacitor 72, a first filter inductor 74, and a second filter inductor 76. First filter inductor 74 is connected between supply line 32u and output line 34. First compensator capacitor 70 is connected between output line 34 and supply line 32w. Second compensator capacitor 72 is connected between supply line 32w and output line 36. Second filter inductor 76 is connected between supply line 32v and output line 36.

Figure 7:
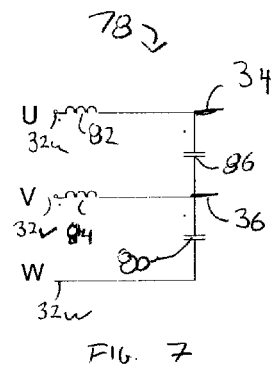
FIGS. 7, 8 and 9 are schematic views of compensator-filter circuits.

Referring now to FIG. 7, in accordance with an embodiment of the invention, a compensator-filter circuit 78 includes a first compensator capacitor 80, a first filter inductor 82, a second filter inductor 84, and a first filter capacitor 86. First filter inductor 82 is connected between supply line 32u and output line 34. First filter capacitor 86 is connected between output line 34 and output line 36. Second filter inductor 84 is connected between lines 32v and output line 36. First compensator capacitor 80 is connected between supply line 32w and output line 36.

Figure 8:
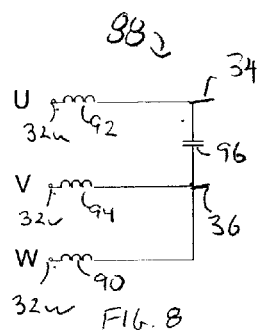

Referring now to FIG. 8, in accordance with an embodiment of the invention, a compensator-filter circuit 88 includes a compensator inductor 90, a first filter inductor 92, a second filter inductor 94, and a filter capacitor 96. First filter inductor 92 is connected between supply line 32u and output line 34. Filter capacitor 96 is connected between output line 34 and output line 36. Second filter inductor 94 is connected between supply line 32v and output line 36. Compensator inductor 90 is connected between supply line 32w and output line 36.

Figure 9:
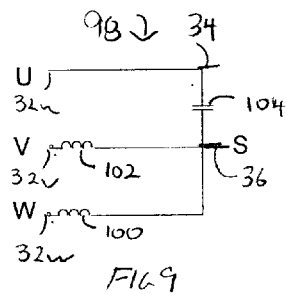

Referring now to FIG. 9, in accordance with an embodiment of the invention, a compensator-filter circuit 98 includes a compensator inductor 100, a filter inductor 102, and a filter capacitor 104. Supply line 32u is connected to output line 34. Filter capacitor 104 is connected between output line 34 and output line 36. Filter inductor 102 is connected between supply line 32V and output line 36. Compensator inductor 100 is connected between supply line 32W and output line 36.

Referring now to FIGS. 3-9, compensator-filter circuit 22 can be any of compensator-filter circuits 38, 54, 68, 78, 88,
and 98. The determination and calculation of the sizing of compensator-filter circuit 22 components is discussed hereinafter.

Figure 10:
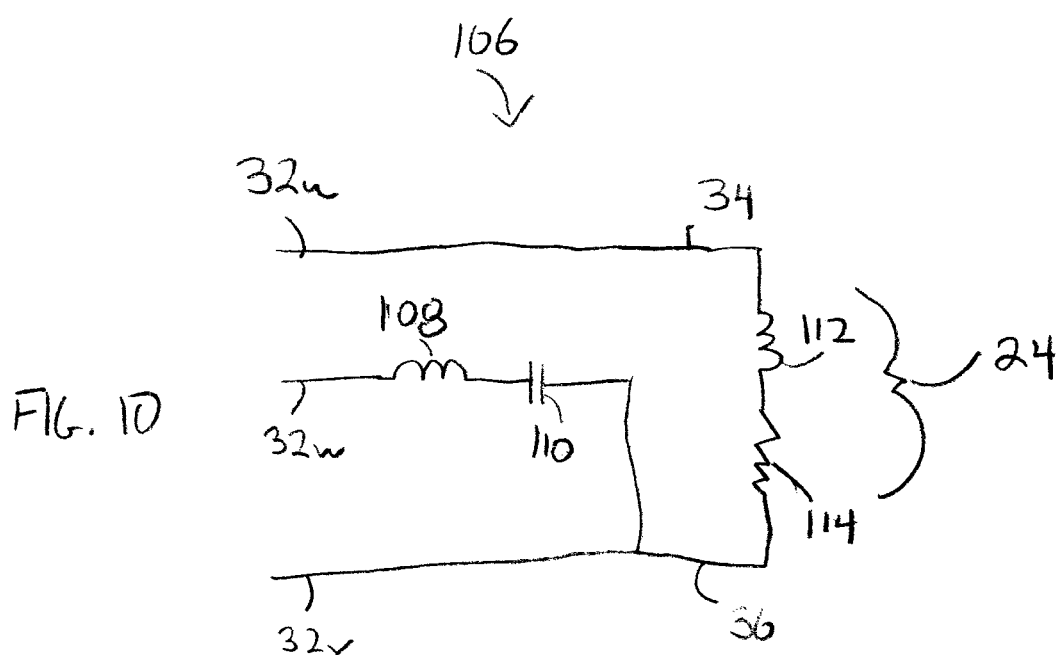
FIG. 10 is a schematic view of single-phase load connected to an equivalent compensator-filter circuit of the compensator-filter circuits of FIGS. 4 through 9.

Compensator-filter circuits 38, 54, 68, 78, 88, and 98 can be simplified to an equivalent compensator-filer circuit 106 shown in FIG. 10 in order to derive a set of equations used to design and size the compensator-filter circuits. Equivalent compensator-filter circuit 106 includes a compensator inductor 108 and a compensator capacitor 110 connected in series between supply line 32w and output line 36. Supply line 32u is connected to output line 34 and supply line 32v is connected to output line 36. Equivalent compensator-filter circuit 106 is shown connected to single-phase load 24 to aid the derivation of the following equations. Single-phase load 24 includes a load inductor 112 and a load resistor 114 that are connected in series between output lines 34 and 36. Equivalent compensator-filter circuit 106 operates like a capacitor because the impedance of compensator inductor 108 is much smaller than the impedance of compensator capacitor 110. In deriving the following equations, single-phase load 24 is assumed that load inductor 112 has an inductance $L_o$ and load resister 114 has a resistance $R_o$. Ignoring the high frequency components of terminal voltage and current, the fundamental component of the load terminal voltage and current can be expressed as:

$$V_l(t)=V_{lm}\cdot\cos(\omega t)$$

$$i_l(t)=I_{lm}\cdot\cos(\omega t-\phi) \quad (1)$$

where $V_{lm}$ and $I_{lm}$ are the amplitude of the load voltage and load current, respectively, $\omega$ is the angular speed of single-phase load 24 and $\phi$ is the power factor angle of single-phase load 24. Based on the fundamental components of the load terminal voltage and current, the instantaneous active power flowing into single-phase load 24 can be expressed as:

$$P_l(t) = V_l(t) \cdot i_l(t) = \frac{V_{lm}I_{lm}}{2}[\cos\varphi + \cos(2\omega t - \varphi)] \quad (2)$$

If there is no compensator-filter circuit, the DC link current generated by single-phase load 24 can be expressed as:

$$i_{dco,1}(t) = \frac{P_l(t)}{V_{dc}} = \frac{V_{lm}I_{lm}}{2V_{dc}}[\cos\varphi + \cos(2\omega t - \varphi)] \quad (3)$$

where $i_{dco,1}(t)$ is the DC link current caused by single-phase load 24 directly and $V_{dc}$ is the DC link voltage. Equation (3) demonstrates that a large amount of second-order harmonics exist in the DC link current. If nothing compensates for the second-order harmonics, the drive 10 cannot provide high quality input current waveforms. Moreover, since most of these harmonic currents flow into the DC link capacitor, the current flowing into the capacitor increases dramatically and the capacitor may be damaged.

The inventive compensator-filter circuits can help to cancel out this harmonic current. In general, the compensator-filter circuit voltage and current can be expressed as:

$$V_c(t)=V_{cm}\cdot\cos(\omega t-\theta)$$

$$i_c(t)=I_{cm}\cdot\cos(\omega t-\theta-\phi_c) \quad (4)$$

where $V_{cm}$ and $I_{cm}$ are the amplitudes of the compensator-filter circuit voltage and current, respectively, $\theta$ is the angle difference between the load voltage and the compensator-filter circuit voltage, and $\phi_c$ is the power factor angle of compensator-filter circuit. Generally, for an inductive compensator-filter circuit such as circuits 38 and 42, $\phi_c$ tends to be close to $\pi/2$. Generally, for a compensator-filter circuit as discussed hereinafter, $\phi_c$ tends to be substantially equal to $-\pi/2$. Based on Equation (4), the instantaneously active power flowing into the compensator-filter circuit can be expressed as:

$$P_c(t) = V_c(t) \cdot i_c(t) = \frac{V_{cm}I_{cm}}{2}\cos(2\omega t - 2\theta - \varphi_c) \quad (5)$$

If the DC link capacitor is sized appropriately and the DC bus voltage can be assumed as a constant, the DC link current generated by the compensator-filter circuit can be expressed as:

$$i_{dco,c}(t) = \frac{P_c(t)}{V_{dc}} = \frac{V_{cm}I_{cm}}{2V_{dc}}\cos(2\omega t - 2\theta - \varphi_c) \quad (6)$$

where, $i_{dco,c}(t)$ is the DC link current generated by the compensator-filter circuit. The following equation can be used to compensate for the low order DC link current harmonics by canceling them out:

$$\frac{V_{cm}I_{cm}}{2V_{dc}}\cos(2\omega t - 2\theta - \varphi_c) = -\frac{V_{bm}I_{bm}}{2V_{dc}}\cos(2\omega t - \varphi) \quad (7)$$

From Equation (7), the following equation can be derived:

$$V_{cm}I_{cm} = V_{bm}I_{bm} \quad (8)$$
$$\theta = \frac{\varphi}{2} - \frac{\varphi_c}{2} \pm \frac{\pi}{2}$$

Equation (8) can be used to calculate the size of compensator-filter circuits like equivalent compensator-filer circuit 106 that will compensate for low-order current harmonics generated by a particular one-phase load on a three-phase drive.

Compensator-filter circuits 38, 54, 68, 78, 88, and 98 (shown in FIGS. 4-9) can be designed/sized by first simplifying the circuits to equivalent compensator-filer circuit 106 (shown in FIG. 10) and then designed/sized as described above for equivalent compensator-filer circuit 106. The simplification of compensator-filter circuit 38 to equivalent compensator-filer circuit 106 will be discussed hereinafter, and compensator-filter circuits 54, 68, 78, 88, and 98 can be simplified following a similar strategy. When design/sizing compensator-filter circuits with a filter capacitor, the filter capacitor may be neglected because it is very small.

Figure 11:
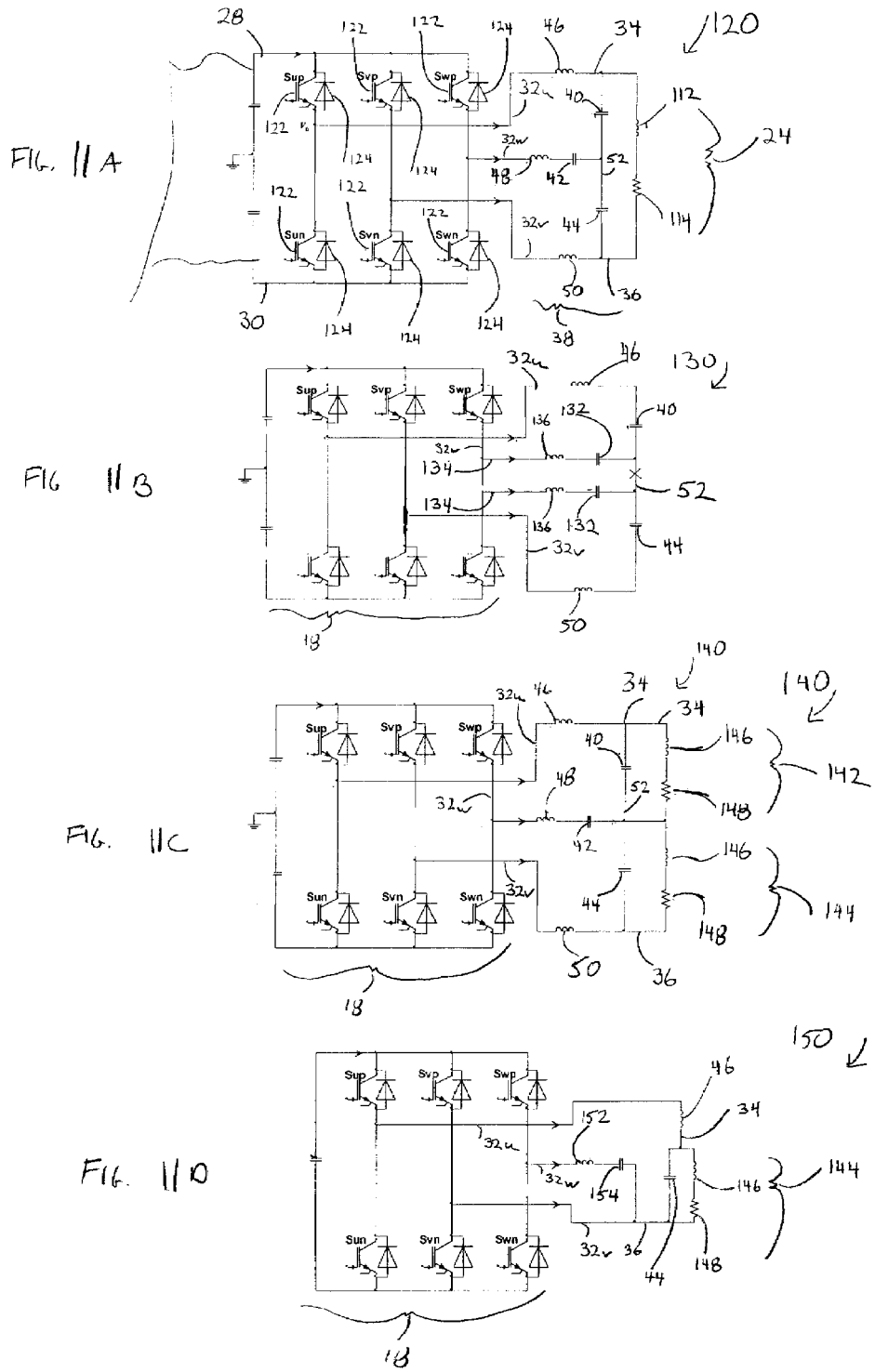
FIGS. 11A through 11D are schematic views of circuits of an inverter of a drive system with the compensator-circuit of FIG. 4.

FIG. 11A shows the drive side of a circuit 120 with inverter 18 connected to compensator-filter circuit 38 that is connected a single phase load 24, compensator-filter circuit 38 compensating for low-order harmonics caused by load 24. Inverter 18 has gate-controlled switches 122 that are connected in pairs across DC busses 28 and 30, with the junction between each pair of switching being connected to one of supply lines 32u, 32v and 32w. Switches 122 are each in parallel with a diode 124. First filter inductor 46 is connected between supply line 32u and output line 34. First compensator capacitor 40 is connected between line 34 and compensator line 52. Second compensator capacitor 42 and second filter inductor 48 are connected in series between supply line 32w and compensator line 52. Third compensator capacitor 44 is connected between compensator line 52 and output line 36. Third filter inductor 50 is connected between supply line 32v and output line 36. Load inductor 112 and load resistor 114 are connected in series between output lines 34 and 36. First and third compensator capacitors 40 and 44 have a capacitance of $C_c$, and second compensator capacitor 42 has a capacitance of $C_{c1}$. First, second and third filter inductors 46, 48 and 50 have an inductance of $L_f$. It is assumed that the neutral point of the DC link voltage is set as 0. The two output phases connected with load 24, which are the phases on supply lines 32u and 32v, are set as reversed as illustrated in the following equations:

$$V_u(t) = -V_v(t) = \frac{V_l(t)}{2} = V_l \cdot \cos(\omega t) \quad (9)$$

where $V_u(t)$ is the voltage on supply line 32u, $V_v(t)$ is the current on line 32v. Similarly, the phase voltage of the other phase, which is the phase on supply line 32w can be expressed as:

$$V_w(t) = V_{cm} \cdot \cos(\omega t - \theta) \quad (10)$$

where $V_w(t)$ is the voltage on supply line 32w. Usually, the phases on lines 32u and 32v connect to single-phase load 24 through a filter inductor. The voltage of the filter inductance is small and can be neglected. As a result, the capacitor voltage can be used to set the voltage command. The amplitude and phase shift angle of the compensator-filter circuit voltage can be adjusted to create a constant power flow at the output of the inverter.

The circuit shown in FIG. 11A can be separated into two simplified circuits by setting one of the voltages in equation (9) and (10) to be 0. FIG. 11B shows the drive side of a first simplified circuit 130 derived by connecting the phases on supply lines 32u and 32v to the neutral point of the DC link voltage (voltages in equation (9) are 0). The active power generated by the phase on line 32w can be calculated according to first simplified circuit 130. In first simplified circuit 130, second compensator capacitor 42 has been divided into two identical equivalent second compensator capacitors 132 that are connected in parallel on equivalent second capacitor compensator lines 134 between supply line 32w and compensator line 52. The equivalent second compensator capacitors 132 have a capacitance that is half of the capacitance of second compensator capacitor 42. Second filter inductor 48 has been divided into two identical equivalent second filter inductors 136 each connected in serial with one of equivalent second compensator capacitors 132. Equivalent second filter inductors 136 have an inductance that is two times the inductance of second filter inductor 48. First filter inductor 46 and first compensator capacitor 40 are connected in series between supply line 32u and compensator line 52. Third filter inductor 50 and third compensator capacitor 44 are connected between supply line 32v and compensator line 52. Under this condition, the current of the phases on lines 32u and 32v can be derived as follows:

$$i_{u,2}(t) = i_{v,2}(t) = -\frac{i_{c,2}(t)}{2} = -\frac{V_{cm}}{|Z_c|}\sin(\omega t - \theta - \varphi_c) \quad (11)$$

$$Z_c = 3j\omega L_f + \frac{2}{j\omega C_{c1}} + \frac{1}{j\omega C_c}$$

where $i_{u,2}(t)$ is the output current of the phase on line 32u, $i_{v,2}(t)$ is the output current of the phase on line 32v, and $$\frac{i_{c,2}(t)}{2}$$

is the output current of the phase on line 32w; $i_{u,2}(t)$, $i_{v,2}(t)$ and $i_{c,2}(t)$ are currents generated by voltage on the inverter connecting with line 32w and compensator line 52. $Z_c$ is the impedance of the leg of one of equivalent second filter inductors 136 (i.e., impedance one equivalent second filter inductor 136 in series with one equivalent second compensator capacitor 132). $\phi_c$ is the angle of the impedance $Z_c$ as shown in equation (11).

FIG. 11C shows the drive of a second separate circuit 140 derived by assuming that the voltage of supply line 32w equals the neutral point of the DC link voltage, i.e equation (10) voltage set to 0. The active power of the phases on lines 32u and 32v can be calculated according to second separate circuit 140. In second simplified circuit 140, single-phase load 24 has been divided into first simplified single-phase load 142 and second simplified single-phase load 144, each of simplified single-phase loads 142 and 144 having a simplified load inductor 146 and a simplified load resistor 148 connected in series. Simplified load inductors 146 have an inductance that is half of the inductance of load inductor 112. Simplified load resistors 148 have a resistance that is half of the resistance of load resistor 114. First simplified load inductor 146 is connected between output line 34 and compensator line 52. Second simplified load inductor 148 is connected between output line 36 and compensator line 52. First filter inductor 46 is connected between supply line 32u and output line 34. First compensator capacitor 40 is connected between output line 34 and compensator line 52. Second filter inductor 48 and second compensator capacitor 42 are connected in series between supply line 32w and compensator line 52. Third filter inductor 50 is connected between line 32u and output line 36. Third compensator capacitor 44 is connected between output line 36 and compensator line 52. Under this condition, the output current of phase U on line 32u can be expressed as:

$$i_{u,1}(t) = i_{v,1}(t) = \frac{i_u(t) - i_v(t)}{2} = \frac{V_{lm}/2}{|Z_{l-c}|}\cos(\omega t - \angle Z_{l-c}) \quad (12)$$

$$Z_{l-c} = j\omega L_f + j\omega C_c // \left(\frac{j\omega L_o}{2} + \frac{R_o}{2}\right)$$

$$i_{c,1}(t) = 0$$

where $i_{u,1}(t)$ is the output current of the phase on supply line 32u, $i_{v,1}(t)$ is the output current of the phase on supply line 32v, $i_{u,1}$ is the output current of the phase on supply line 32w, and $i_{u,1}(t)$, $i_{v,1}(t)$ and $i_{u,1}$ are generated by the phases on lines 32u and 32v. $Z_{l-c}$ is the simplified load impedance that is calculated by adding the impedance $L_f$ of one filter inductor with an impedance calculated by paralleling the capacitance $C_c$ of one compensator capacitor with half of the impedance of load 24.

FIG. 11D shows a simplified circuit 150 derived by adding first simplified circuit 130 with second simplified circuit 140. Simplified circuit 150 is the three compensator capacitors with three filter inductors simplified to the one-compensator capacitor with one filter inductor simplified compensator-filer circuit 106. In this simplified circuit 150, filter inductor 46 is connected between lines 32u and output line 34. Supply line 32v is connected to output line 34. An simplified filter inductor 152 and an simplified compensator capacitor 154 are connected in series between line 32w and output line 36. Simplified load inductor 154 has an inductance that is calculated by paralleling the capacitance $C_c$ of each of compensator capacitors 40 and 44 with half of the capacitance $C_{c1}$ of compensator capacitor 42. Simplified filter inductor 152 has an inductance equal to three times the inductance $L_f$ of each of the filter inductors 46, 48 and 50. Compensator capacitor 44 and simplified single-phase load 144 are connected in parallel between output lines 34 and 36. Then, the current and voltage of third simplified circuit 150 can be defined as:

$$V_{uv}^*(t) = \frac{V_l(t)}{2} = V_{lm} \cdot \cos(\omega t) \quad (13)$$

$$i_u^*(t) = i_{u,1}(t) = \frac{i_u(t) - i_v(t)}{2} = \frac{V_{lm}/2}{|Z_{l-c}|}\cos(\omega t - \angle Z_{l-c})$$

$$V_c^*(t) = V_c(t) = V_{cm} \cdot \cos(\omega t - \theta)$$

$$i_c^*(t) = \frac{i_{c,2}(t)}{2} = \frac{i_c(t)}{2}$$

where the compensator leg is the leg between supply line 32w and output line 36 (as shown in FIGS. 10 and 11D). Equation (13) can used to design and size compensator-filter circuit 38 similar to the design and sizing described hereinabove for simplified compensator-filer circuit 106.

The filter inductors smooth or the current ripple generated by the switching side of inverter 18. Filter inductors (e.g., filter inductors 46, 48 and 50) can have an inductance $L_f$ of about 3-5% pu of rated impedance. The resonance frequencies of filter inductors (and of filter capacitors according to other embodiments of the compensator-filter circuit) can be slightly lower than the switching frequency of the inverter. The filter inductors can be neglected (i.e., $L_f \approx 0$) during sizing and designing the compensator-filter circuits because the compensator-capacitors (e.g., 40, 42 and 44) have capacitances $C_c$ and $C_{c1}$ that can be around 1 pu of the rated impedance.

The next step in designing compensator-filter circuit 38 is to determine the maximum compensator-filter circuit voltage. According to FIG. 11D, the maximum amplitudes $V_{cm}$ and $V_{lm}$ of the compensator-filter circuit voltage $V_c(t)$ and load and the load voltage $V_l(t)$, respectively, can be limited by half of the DC link voltage in order to reduce the capacitance and maximum compensation capacity of the compensator-filter circuit, thus the maximum amplitudes can be expressed as:

$$V_{cm} \leq \frac{V_{dc}}{2} \quad (14)$$

-continued $$V_{lm} = \left|\frac{V_l}{2}\right| \le \frac{V_{dc}}{2}$$

Where $V_{dc}$ is the DC link voltage between DC buses 28 and 30. $V_{cm}$ can be approximated as the upper limit, where $V_{cm}$ can be expressed as:

$$V_{am} = \frac{V_{dc}}{2} \quad (15)$$

Then the capacitances $C_c$ for compensator-compensators 40 and 44 and $C_{c1}$ for compensator-capacitor 44 can be calculated so that compensator-filter circuit 38 compensates for low-order harmonics without exceeding the current rating of the drive. The capacitances $C_c$ and $C_{c1}$ can be set to be equal to simplify design and sizing. According to Equations (13), (14) and (15), the amplitude of the compensator leg current $I_{au}$ can be expressed as:

$$I_c = 2i_c^* = \frac{1}{\frac{2}{\omega C_{c1}} + \frac{1}{\omega C_c}} V_{cm} = \frac{1}{3}\omega C_c \frac{V_{dc}}{2} = \frac{1}{6}\omega C_c \le I_{max} \quad (16)$$

where $I_{max}$ is the rated current amplitude of the drive which is determined by the drive. Then the capacitances $C_c$ can be expressed as:

$$C_c \le \frac{I_{max}}{\frac{1}{6}\omega V_{dc}} \le \frac{6 I_{max}}{\omega_{min} V_{dc}} \quad (17)$$

where $\omega_{min}$ is the minimum angular frequency of the single-phase load. The capacitances can be selected to be $$\frac{6 I_{max}}{\omega_{min} V_{dc}},$$

which corresponds to the maximum current value, in order to maximize the compensation capacity of the compensator-filter circuit. Then the current ratings of each compensator-capacitor can be calculated. According to FIG. 11D, the current rating of compensator-capacitor 42 is mainly determined by its capacitance and the compensator leg voltage and, thus, the maximum rating of compensator-capacitor 42 is similar to the current rating of the drive. The capacitor ratings of compensator-capacitors 40 and 44 can be calculated by combining Equations (8), (13) and (16).

The capacitances of the compensator-capacitors can also be determined by having the capacitance $C_{c1}$ of compensator-capacitor 42 be selected as twice of the capacitance $C_c$ of compensators-capacitors 40 and 44. In this configuration equation (16) can be expressed as:

$$i_c = 2i_c^* = \frac{1}{\frac{2}{\omega C_c} + \frac{1}{\omega C_c}} V_{am} = \frac{1}{2}\omega C_c \frac{V_{dc}}{2} = \frac{1}{4}\omega C_c \le I_{max} \quad (18)$$

and then the compensator-capacitor capacitances $C_c$ and $C_{c1}$ can be set as:

$$C_c = \frac{4 I_{max}}{\omega_{min} V_{dc}} \quad (19)$$

$$C_{c1} = \frac{8 I_{max}}{\omega_{min} V_{dc}}$$

Figure 12:
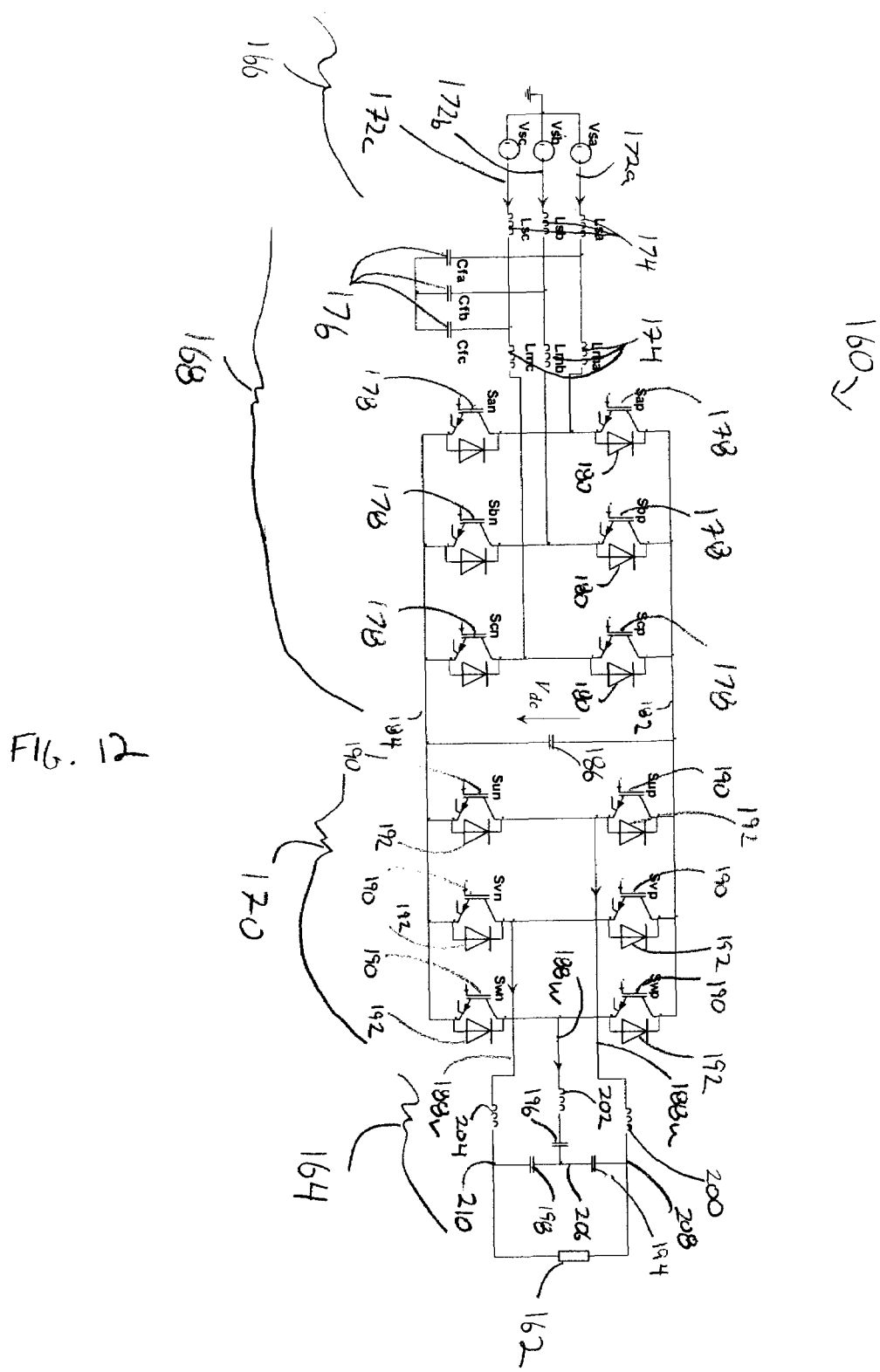
FIG. 12 is a schematic view of a drive system and compensator-filter circuit in accordance with an embodiment of the invention.

FIG. 12 is a schematic illustrating an exemplary system used to simulate the consequences of using and not using one inventive compensator-filter circuit consistent with the FIG. 4 embodiment. FIGS. 13A-13F show operational results with and without the compensator-filter circuit. FIG. 12 shows a drive system 160 providing three-phase power to a single-phase load 162, a compensator-filter circuit 164 reducing the negative effects caused by the drive 160 providing power to single-phase load 162. Drive 160 includes a power supply 166, rectifier 168, and inverter 170. Power supply 166 provides a three-phase AC voltage received from the utility grid on lines 172*a*, 172*b* and 172*c*. Rectifier 168 receives the three-phase power over lines 172*a*, 172*b* and 172*c* and coverts the AC power to DC. Rectifier 168 further includes a plurality of inductors 174, capacitors 176, switching devices 178 and diodes 180 connected by a plurality of lines and buses. The switching devices 178 are controlled to generate the DC potential between a first DC bus 182 and a second DC bus 184 that are connected to inverter 170. A DC link capacitor 186 is connected between first DC bus 182 and second DC bus 184. Inverter 170 provides three-phase power on supply lines 188*u*, 188*v*, and 188*w* by controlling a plurality of switching devices 190 and diodes 192 connected by a plurality of lines and buses. The controllers of rectifier 168 and inverter 170 are not shown. Compensator-filter circuit 164 includes a first compensator capacitor 194, a second compensator capacitor 196, a third compensator capacitor 198, a first filter inductor 200, a second filter inductor 202, a third filter inductor 204, a compensator line 206, a first output line 208 and a second output line 210. A first filter-inductor 194 is connected between supply line 188*u* and first output line 208. First compensator capacitor 194 is connected between first output line 208 and compensator line 206. Second compensator capacitor 196 and second filter inductor 202 are connected in series between supply line 32*w* and compensator line 206. Third filter inductor 204 is connected between supply line 32*v* and second output line 210. Third compensator capacitor 198 is connected between second output line 210 and compensator line 206. Single-phase load 162 is connected between first output line 208 and second output line 210. The compensator capacitors 194, 196 and 198 are equally sized.

Figure 13A:
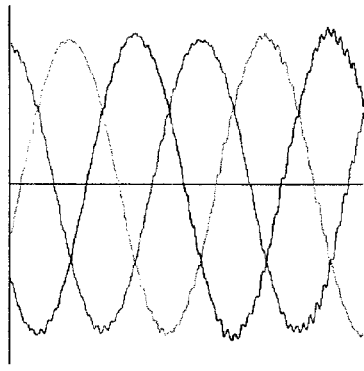
FIGS. 13A and 13B are graphs illustrating input current for a three-phase drive powering a single-phase load with a compensator-filter circuit and a single-phase load without a compensator-filter circuit, respectively.
Figure 13B:
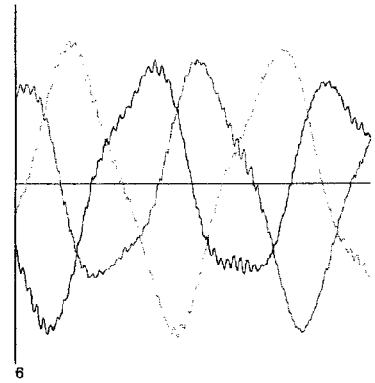
Figure 13C:
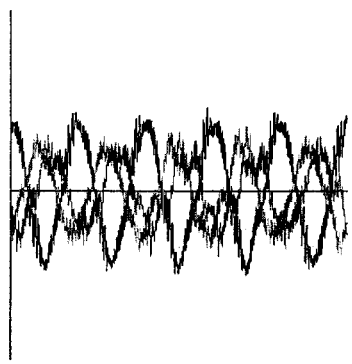
FIGS. 13C and 13D are graphs illustrating output current for a three-phase driving powering a single-phase load with a compensator-filter circuit and a single-phase load without a compensator-filter circuit, respectively.
Figure 13D:
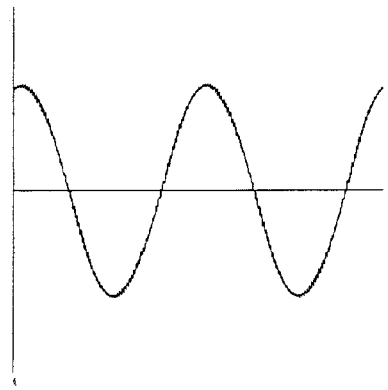
Figure 13E:
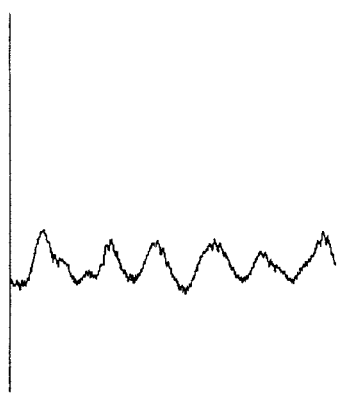
FIGS. 13E and 13F are graphs illustrating DC link current for a three-phase drive powering a single-phase load with a compensator-filter circuit and a single-phase load without a compensator-filter circuit, respectively.
Figure 13F:
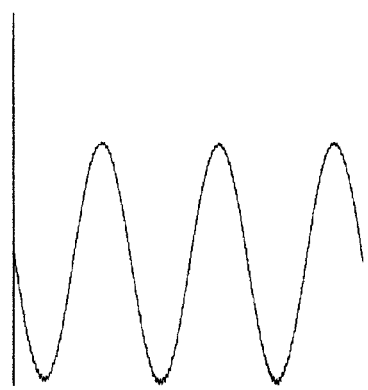

The benefits of using compensator-filter circuit 164 are illustrated in FIGS. 13A through 13F. FIG. 13A illustrates the input current on lines 72*a*, 172*b* and 172*c* when compensator-filter circuit 164 is used. FIG. 13B illustrates the input current on lines 72*a*, 172*b* and 172*c* when a compensator-filter circuit is not used. Note the improvement of the input current when a compensator-filter circuit is used. FIG. 13C illustrates the output voltages on supply lines 188*u*, 188*v*, and 188*w* when compensator-filter circuit 164 is used. FIG. 13D illustrates the output voltages on supply lines 188u, 188v, and 188w when a compensator-filter is not used. FIG. 13E illustrates the DC link voltage of DC link capacitor 186 when compensator-filter circuit 164 is used. FIG. 13F illustrates the DC link voltage of DC link capacitor 186 when a compensator-filter circuit is not used.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A system for reducing low order current harmonics in a three-phase drive system receiving a three-phase source voltage and driving an unbalanced load, the system comprising:
    a rectifier system connected to the three-phase source voltage;
    at DC link capacitor connected to the rectifier system;
    a three-phase voltage source inverter connected to the DC link capacitor and supplying a first phase, a second phase, and a third phase;
    an compensator-filter circuit connected to the first, second, and third phases, the compensator-filter comprising a first output line and a second output line; and
    a single-phase load connected between the first output line and the second output line.

2. The system of claim 1, wherein the compensator-filter circuit substantially cancels out a DC link current caused by the single-phase load.

3. The system of claim 2, wherein the compensator-filter circuit further comprises a first compensator capacitor, a second compensator capacitor, a third compensator capacitor, a first filter inductor, a second filter inductor, a third filter inductor, and a compensator line; wherein the first filter inductor is connected between the first phase and the first output line, the first compensator capacitor is connected between the first output line and the compensator line, the second filter inductor and second compensator capacitor are connected in series between the third phase and the compensator line, the third filter inductor is connected between the second phase and the second output line, and the third compensator capacitor connected between the second output line and the compensator line.

4. The system of claim 3, wherein the first compensator capacitor, second compensator capacitor and compensator capacitor are equally sized.

5. The system of claim 4, wherein the first compensator capacitor, second compensator capacitor and compensator capacitor each have a capacitance $C_c$, the capacitance $C_c$ determined using the following equation:

$$C_c \leq \frac{6 I_{max}}{\omega_{min} V_{dc}}$$

where $I_{max}$ is a rated current amplitude of the drive system, $\omega_{min}$ is a minimum angular speed of the single-phase load and $V_{dc}$ is a voltage of the DC link capacitor.

6. The system of claim 3, wherein the first compensator capacitor, the second compensator capacitor and the third compensator capacitor have a capacitance of approximately 1 pu of rated impedance and the first filter inductor, the second filter inductor and the third filter inductor have an inductance within a range of 0.03 pu to 0.05 pu.

7. The system of claim 3, wherein the first compensator capacitor and third compensator capacitor have a first capacitance $C_c$ and the second capacitor has a second capacitance $C_{c1}$ that is twice as large as the first capacitance.

8. The system of claim 7, wherein first capacitance $C_c$ and second capacitance $C_{c1}$ are determined using the following set of equations:

$$C_c = \frac{4 I_{max}}{\omega_{min} V_{dc}}$$

$$C_{c1} = \frac{8 I_{max}}{\omega_{min} V_{dc}}$$

where $I_{max}$ is a rated current amplitude of the drive system, $\omega_{min}$ is a minimum angular speed of the single-phase load and $V_{dc}$ is a voltage of the DC link capacitor.

9. The system of claim 2; wherein the compensator-filter circuit further comprises a first compensator capacitor, a second compensator capacitor, a first filter inductor, a second filter inductor, a third filter inductor, and a compensator line; wherein the first filter inductor is connected between the first phase and the first output line, the first compensator capacitor is connected between the first output line and the compensator line, the second filter inductor is connected between the third phase and the compensator line, the second compensator capacitor is connected between the second output line and the compensator line, and the third filter inductor is connected between the second phase and the second output line.

10. The system of claim 2; wherein the compensator-filter circuit further comprises a first compensator capacitor, a second compensator capacitor, a first filter inductor, and a second filter inductor; wherein the first filter inductor is connected between the first phase and the first output line, the first compensator capacitor is connected between the first output line and the third phase, the second filter inductor is connected between the second phase and the second output line, and the second compensator capacitor connected between the second output line and the third phase.

11. The system of claim 2, wherein the compensator-filter circuit further comprises a compensator capacitor, a filter capacitor, a first filter inductor, and a second filter inductor; wherein the first filter inductor is connected between the first phase and the first output line, the second filter inductor is connected between the second phase and the second output line, the compensator capacitor is connected between the third phase and the second output line, and the filter capacitor is connected between the first output line and the second output line.

12. The system of claim 2, wherein the compensator-filter circuit further comprises a compensator inductor, a first filter inductor, a second filter inductor, and a filter capacitor; wherein the first filter inductor is connected between the first phase and the first output line, the second filter inductor is connected between the second phase and the second output line, the compensator inductor is connected between the third phase and the second output line, and the filter capacitor is connected between the first output line and the second output line.

13. The system of claim 2, wherein the compensator-filter circuit further comprises a compensator inductor, a filter inductor, and a filter capacitor; wherein the first phase is connected to the first output line; the filter inductor is connected between the second phase and the second output line, the compensator inductor is connected between the third phase and the second output line, and the filter capacitor is connected between the first output line and the second output line.

14. The system of claim 2, wherein the following set of equations is used to design the compensator filter circuit:

$$V_{cm}I_{cm} = V_{lm}I_{lm}$$

$$\theta = \frac{\varphi}{2} - \frac{\varphi_c}{2} \pm \frac{\pi}{2}$$

$$V_{uv}^*(t) = \frac{V_l(t)}{2} = V_{lm} \cdot \cos(\omega t)$$

$$i_u^*(t) = i_{u,1}(t) = \frac{i_u(t) - i_v(t)}{2} = \frac{V_{lm}/2}{|Z_{l-c}|} \cos(\omega t - \angle Z_{l-c})$$

$$V_c^*(t) = V_c(t) = V_{cm} \cdot \cos(\omega t - \theta)$$

$$i_c^*(t) = \frac{i_{c,2}(t)}{2} = \frac{i_c(t)}{2}$$

where $V_c(t)$ is a compensator-filter circuit voltage, $V_{cm}$ is an amplitude of the compensator-filter circuit voltage, $i_c(t)$ is a compensator-filter circuit current, $I_{cm}$ is an amplitude of the compensator-filter circuit current, $V_l(t)$ is a load voltage, $V_{lm}$ is an amplitude of the load voltage, $i_u(t)$ is a load current, $I_{lm}$ is the amplitude of the load current, $\theta$ is an angle difference between the compensator-filter circuit voltage and the load voltage, $\phi$ is a power factor angle of the load, $\phi_c$ is a power factor angle of the compensator-filter circuit, $\omega$ is an angular speed of the single-phase load, $V^*_{uv}(t)$ is an equivalent load voltage, $i^*_u(t)$ is an equivalent load current, $i_u(t)$ is a current on a first phase, $i_{u,1}(t)$ is an equivalent current on a first phase, $i_v(t)$ is a current on a second phase, $Z_{l-c}$ is an equivalent load impedance, $V^*_c(t)$ is an equivalent compensator-filter circuit voltage, $i^*_u(t)$ is an equivalent compensator-filter circuit current and $i_{c,2}(t)$ is a second equivalent compensator-filter circuit current.

15. A system for reducing low order current harmonics in a three-phase drive system receiving a three-phase source voltage and driving an unbalanced load, the system comprising:

a rectifier system connected to the three-phase source voltage;

a DC link capacitor connected to the rectifier system;

a three-phase source inverter connected to the DC link capacitor and supplying a first phase, a second phase, and a third phase;

an compensator-filter circuit connected to the first, second, and third phases, the compensator-filter comprising at least two compensator capacitors, at least two filter inductors, a first output line and a second output line; and a single-phase load connected between the first output line and the second output line.

16. The system of claim 15, wherein the at least two compensator capacitors are sized so that a DC link current caused by the compensator-filter circuit substantially cancels out a DC link current caused by the single-phase load.

17. The system of claim 15 wherein the at least two filter inductors are sized to filter out a ripple current caused by switching of the inverter.

18. A system for reducing low order current harmonics in a three-phase drive system receiving a three-phase source voltage and driving an unbalanced load, the system comprising:

a rectifier system connected to the three-phase source voltage;

a DC link capacitor connected to the rectifier system;

a three-phase source inverter connected to the DC link capacitor and supplying a first phase, a second phase, and a third phase;

an compensator-filter circuit connected to the first, second, and third phases, the compensator-filter comprising, at least one filter inductor, at least one filter capacitor; a first output line, a second output line and one of 1) at least one compensator inductor and 2) at least one compensator inductor; and a single-phase load connected between the first output line and the second output line.

19. The system of claim 18, wherein the one of 1) at least one compensator inductor and 2) at least one compensator inductor is sized so that a DC link current caused by the compensator-filter circuit substantially cancels out a DC link current caused by the single-phase load.

20. The system of claim 18 wherein the at least one filter inductor and the at least one filter capacitor are sized to filter out a ripple current caused by switching of the inverter.

* * * * *

UNITED STATES PATENT AND TRADEMARK OFFICE
CERTIFICATE OF CORRECTION

PATENT NO. : 7,602,622 B2
APPLICATION NO. : 11/461697
DATED : October 13, 2009
INVENTOR(S) : Wei et al.

It is certified that error appears in the above-identified patent and that said Letters Patent is hereby corrected as shown below:

Column 6, Eq. (1), "ф" should be --φ--.

Column 6, line 31, "ф" should be --φ--.

Column 6, Eq. (4), "ф" should be --φ--.

Column 7, line 2, "ф$_c$" should be --φ$_c$--.

Column 7, line 4, "ф$_c$" should be --φ$_c$--.

Column 7, line 6, "ф$_c$" should be --φ$_c$--.

Column 9, line 23, "ф" should be --φ--.

Column 9, line 64, "i$_{u,1}$" should be --i$_{c,1}$--.

Column 9, line 65, "i$_{u,1}$" should be --i$_{c,1}$--.

Column 10, Eq. (13), "
$$V_{uv}^*(t) = \frac{V_l(t)}{2} = V_{lm} \cdot \cos(\omega t)$$
$$i_u^*(t) = i_{u,1}(t) = \frac{i_u(t) - i_v(t)}{2} = \frac{V_{lm}/2}{|Z_{l-c}|} \cos(\omega t - \angle Z_{l-c})$$
$$V_c^*(t) = V_c(t) = V_{cm} \cdot \cos(\omega t - \theta)$$
$$i_c^*(t) = \frac{i_{c,2}(t)}{2} = \frac{i_c(t)}{2}$$
" should be

UNITED STATES PATENT AND TRADEMARK OFFICE
CERTIFICATE OF CORRECTION

PATENT NO. : 7,602,622 B2
APPLICATION NO. : 11/461697
DATED : October 13, 2009
INVENTOR(S) : Wei et al.

It is certified that error appears in the above-identified patent and that said Letters Patent is hereby corrected as shown below:

--Load voltage:
$$V_{uv}^*(t) = \frac{V_l(t)}{2} = V_{lm} \cdot \cos(\omega t)$$

Load current:
$$i_u^*(t) = i_{u,1}(t) = \frac{i_u(t) - i_v(t)}{2} = \frac{V_{lm}/2}{|Z_{l-c}|} \cos(\omega t - \angle Z_{l-c})$$

Compensator leg voltage:
$$V_c^*(t) = V_c(t) = V_{cm} \cdot \cos(\omega t - \theta)$$

Compensator leg current:
$$i_c^*(t) = \frac{i_{c,2}(t)}{2} = \frac{i_c(t)}{2}$$
--.

Column 11, Eq. (16), "
$$I_c = 2i_c^* = \frac{1}{\frac{2}{\omega C_{c1}} + \frac{1}{\omega C_c}} V_{cm} = \frac{1}{3}\omega C_c \frac{V_{dc}}{2} = \frac{1}{6}\omega C_c \leq I_{max}$$
"

should be --
$$I_c = 2i_c^* = \frac{1}{\frac{2}{\omega C_{c1}} + \frac{1}{\omega C_c}} V_{cm} = \frac{1}{3}\omega C_c \frac{V_{dc}}{2} = \frac{1}{6}\omega C_c V_{dc} \leq I_{max}$$
--.

Column 11, Eq. (18), "
$$i_c = 2i_c^* = \frac{1}{\frac{2}{\omega C_c} + \frac{1}{\omega C_c}} V_{am} = \frac{1}{2}\omega C_c \frac{V_{dc}}{2} = \frac{1}{4}\omega C_c \leq I_{max}$$
"

UNITED STATES PATENT AND TRADEMARK OFFICE
CERTIFICATE OF CORRECTION

PATENT NO. : 7,602,622 B2
APPLICATION NO. : 11/461697
DATED : October 13, 2009
INVENTOR(S) : Wei et al.

It is certified that error appears in the above-identified patent and that said Letters Patent is hereby corrected as shown below:

should be --
$$i_c = 2i_c^* = \frac{1}{\frac{2}{\omega C_{c1}} + \frac{1}{\omega C_c}} V_{am} = \frac{1}{2}\omega C_c \frac{V_{dc}}{2} = \frac{1}{4}\omega C_c V_{dc} \leq I_{max}$$
--.

Column 15, Claim 14, line 34, "ф" should be --φ--.

Column 15, Claim 14, line 35, "ф" should be --φ--.

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,602,622 B2
APPLICATION NO. : 11/461697
DATED : October 13, 2009
INVENTOR(S) : Wei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 214 days.

Signed and Sealed this

Fifth Day of October, 2010

David J. Kappos
*Director of the United States Patent and Trademark Office*